United States Patent [19]

Niemoeller

[11] 3,785,356

[45] Jan. 15, 1974

[54] ELECTRONICALLY CONTROLLED IGNITION SYSTEM

[75] Inventor: Donald E. Niemoeller, Lafayette, Ind.

[73] Assignee: Arvin Industries, Inc., Columbus, Ind.

[22] Filed: Nov. 15, 1971

[21] Appl. No.: 198,598

[52] U.S. Cl.... 123/148 E, 123/146.5 A, 123/117 A
[51] Int. Cl. .............................................. F02p 5/04
[58] Field of Search ................. 123/148 E, 146.5 A, 123/117 R

[56] References Cited
UNITED STATES PATENTS

| | | | |
|---|---|---|---|
| 3,660,689 | 5/1972 | Oishi et al. ...................... | 123/32 EA |
| 3,454,871 | 7/1969 | Nolting............................ | 123/148 E |
| 3,202,146 | 8/1965 | Short et al....................... | 123/148 E |
| 3,314,407 | 4/1967 | Schneider........................ | 123/148 E |
| 3,592,178 | 7/1971 | Schiff.............................. | 123/148 E |

Primary Examiner—Laurence M. Goodridge
Assistant Examiner—Cort Flint
Attorney—Verne A. Trask et al.

[57] ABSTRACT

An electronically controlled ignition system for controlling the ignition timing of an internal combustion engine for accordance with engine speed and load. Three linear transducers convert the engine speed, the amount of intake manifold vacuum and the amount of carburetor spark port vacuum into electrical voltages. Three corresponding non-linear function generators generate predeterminable output voltages in accordance with the transducer output voltages. The aggregate of the generator output voltages is taken and used to alter the ignition timing angle of the engine. Any error between the actual alteration and the alteration signalled for is detected by a feedback potentiometer and used to further adjust the ignition timing in accordance therewith.

10 Claims, 11 Drawing Figures 3,785,356

ELECTRONICALLY CONTROLLED IGNITION SYSTEM

BACKGROUND OF THE INVENTION

The present invention relates to an electronically controlled ignition system for an internal combustion engine which controls the ignition timing characteristics of the engine in accordance with engine speed and load.

The ignition timing of internal combustion engines is conventionally controlled by an ignition distributor which comprises a contact breaker, a multi-lobed ignition cam, a distributing rotor and a timing control device for altering the ignition timing in accordance with operating conditions of the engine.

The adjustment of the timing angle characteristics primarily depends on the engine load and speed at any particular time. The ignition cam is mounted on the upper end of a distributor shaft which is adapted to rotate relative to its lower end to effect the changes in the ignition timing. The lower end of the distributor shaft is rotated by the engine crankshaft so that any changes in the ignition timing is commonly referred to as an angular advancement or retardation of the ignition timing as referenced to the crankshaft.

Conventionally, a centrifugal governor rotates the upper end of the distributor shaft, and thereby the cam, in accordance with the speed of rotation supplied by the crank shaft. The governor thereby effects an angular displacement of the ignition cam which is controlled by the speed of the engine, whereby the ignition timing is advanced at higher engine speeds.

Changes in the ignition timing may also be made with respect to the load being sensed by the engine. Changes in intake manifold air vacuum are representative of this loading effect and, by using a flexible diaphragm and a connecting rod, the vacuum changes may be transmitted to the contact breaker in the distributor. The contact breaker is thereby shifted relative to the lobes of the ignition cam to alter the ignition timing. While partially effective, this method of load compensation is not accurate and is susceptible to diaphragm deterioration and vacuum leakage.

Several electronically controlled ignition systems have been proposed to substitute electronic pulse generation for the opening and closing of the contact breaker. This concept has been extended in some cases to include apparatus such as a rotating magnetic field interrupter to effect control of the ignition timing with respect to engine speed. The prime purpose of these systems is to eliminate the relatively high current through the breaker contacts as they are alternately opened and closed. These systems are not concerned with alteration of ignition timing characteristics in response to increases in actual or operator sensed engine load. The systems that do alter the ignition timing do so only in accordance with increases in the engine speed, not with respect to the actual engine loading. Furthermore, these systems do not recognize the loading effect which the operator senses to exist so that the resulting efficient or inefficient operator induced operation may be compensated for.

The present invention overcomes the disadvantages of the prior art systems by providing a closed loop ignition system which controls the timing characteristics of an internal combustion engine in accordance with the speed of the engine and both actual and operator sensed engine load for efficient operation of the engine.

SUMMARY OF THE INVENTION

In accordance with one form of the invention, there is provided an ignition system which comprises an analog signal function generator to synthesize optimum characteristic ignition timing signal curves in response to signals generated by engine speed and load transducers. The synthesized signals are adapted to control an ignition distributor for advancing or retarding the ignition timing angle of the engine so that the operation of the engine will be characterized by the optimum curves.

Pressure sensors such as strain gages may be used as the engine load transducers to sense the pressure differential between atmospheric pressure and the air pressure in the engine intake manifold and at the spark port beneath the carburetor base. The pressure differential at the intake manifold is indicative of the load sensed by the engine, and the differential at the spark port is indicative of the load the engine operator senses the engine to have. It is important that the operator sensed load be taken into account for efficient engine operation with minimal exhaust emissions. A tachometer may be used as the speed transducer to provide an input to the analog signal generator which is indicative of the true speed at which the engine is running. The tachometer is preferably electrical and comprises a pulse to DC level converter adapted for coupling to the distributor output of the ignition coil.

The analog signal generator is comprised of three sections each of which generates a predetermined signal in accordance with the level of input signal obtained from one of the speed or load transducers. The analog signal generator sections are first calibrated so that as their input signals increase in amplitude corresponding to increases in engine load and speed, their output signals will be representative of timing angle alterations required for optimum engine performance.

The output of the analog generator sections are summed together and the total command signal used to advance or retard the ignition timing angle for the engine. In a preferred embodiment, this command signal is utilized to control a servo motor for rotating a modified ignition distributor in accordance with the amplitude of the command signal. A feedback signal representative of the actual rotation of the distributor may be compared to the command signal for closed loop control of the servo motor. Any incongruity between these two signals is used to compensate for any positioning error.

BRIEF DESCRIPTION OF THE DRAWINGS

The accompanying drawings illustrate the invention and, by way of example, show a preferred embodiment. In such drawings.

DETAILED DESCRIPTION OF THE PREFERRED EMBODIMENT

Figure 1:
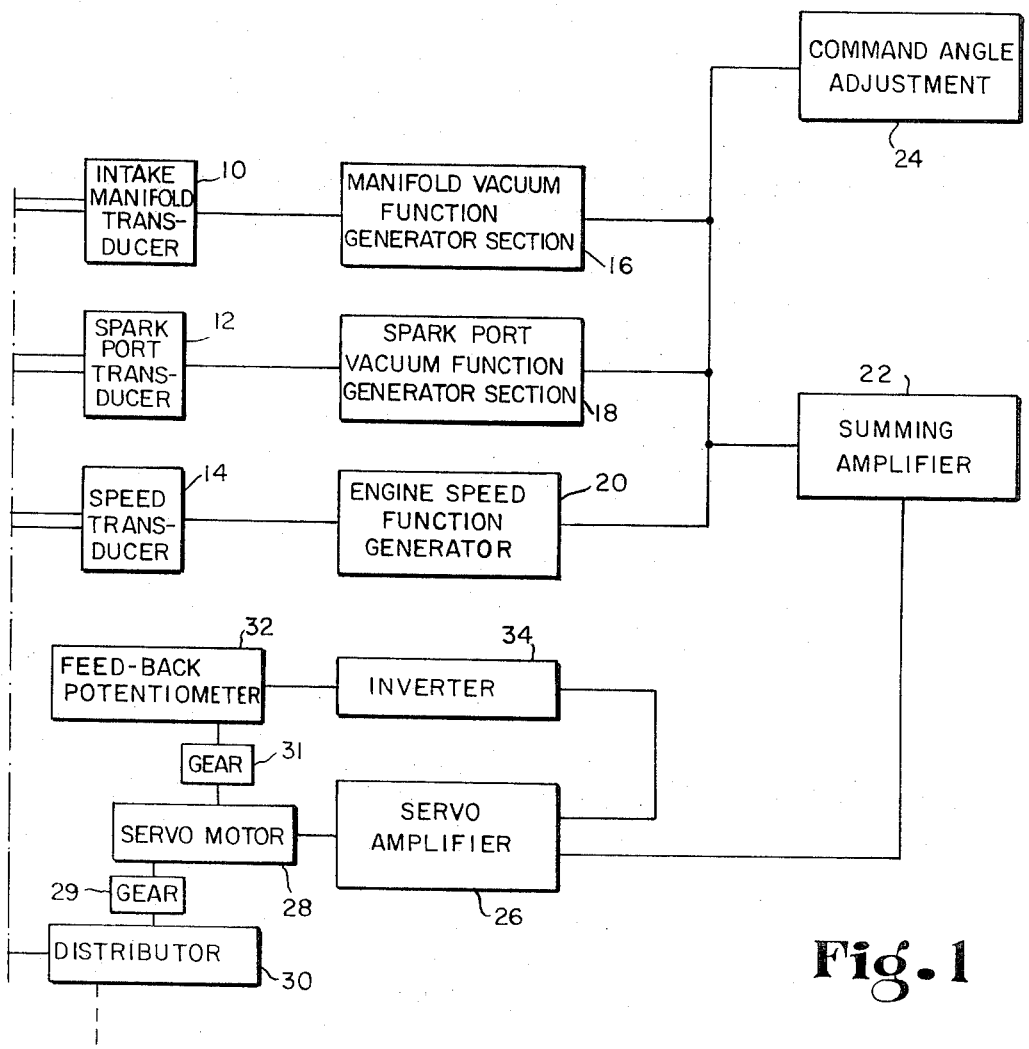
FIG. 1 is a block diagram of the invention.

The system illustrated in the drawings is for the control of the ignition timing angle of an internal combustion engine. Transducers in the system change the intake manifold vacuum, the spark port vacuum and the engine speed to voltages used as inputs to a respective non-linear function generator. The generator is first calibrated or adjusted to yield a predetermined level of output which corresponds to each level of input from its associated transducer. The predetermined output level is found by experiment to result in the most efficient engine operation. The sum of the three generator output levels is taken and used to accordingly change the ignition timing angle of the engine by rotating the distributor. Any distributor positioning error is detected by a feedback potentiometer and the potentiometer output used to further adjust the timing angle.

A block diagram illustrative of one embodiment of the invention is shown in FIG. 1. The input to the system is obtained from two pressure transducers 10 and 12 and a speed transducer 14. One of the pressure transducers is mounted in the intake manifold to sense the pressure differential between the atmosphere and the intake manifold. The vacuum in this manifold is responsible for forcing fuel into the cylinders of the engine and results from the downward movement of the cylinder pistons and is indicative of the loading condition sensed by the engine.

The other pressure transducer 12 is mounted to sense the pressure differential between the spark port at the base of the carburetor and the atmosphere. The magnitude of this pressure differential is an indication of the engine load which the operator perceives the engine to have as opposed to actual load. It is important to take this factor into consideration for more efficient and emission free operation.

The engine speed is detected by the speed transducer 14 which preferably a conventional pulse to D.C. level converter. The speed transducer 14 is connected to the center distributor wire leading from the ignition coil. The resulting speed transducer output is a D.C. signal with an amplitude proportional to the engine speed.

Figure 3:
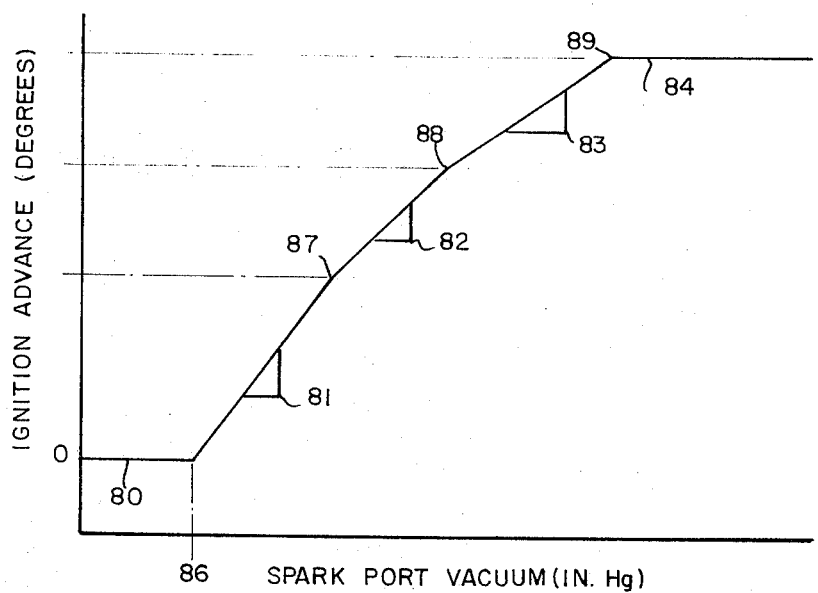
FIG. 3 is a graph showing a typical relationship between the spark port vacuum and the ignition timing angle.
Figure 5:
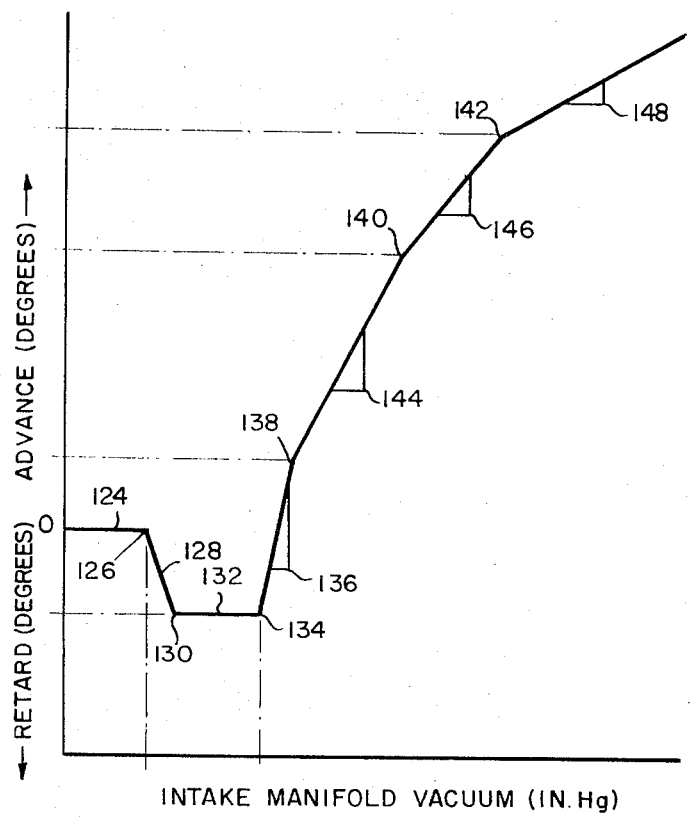
FIG. 5 is a graph showing a typical relationship between the intake manifold vacuum and the ignition timing angle.
Figure 7:
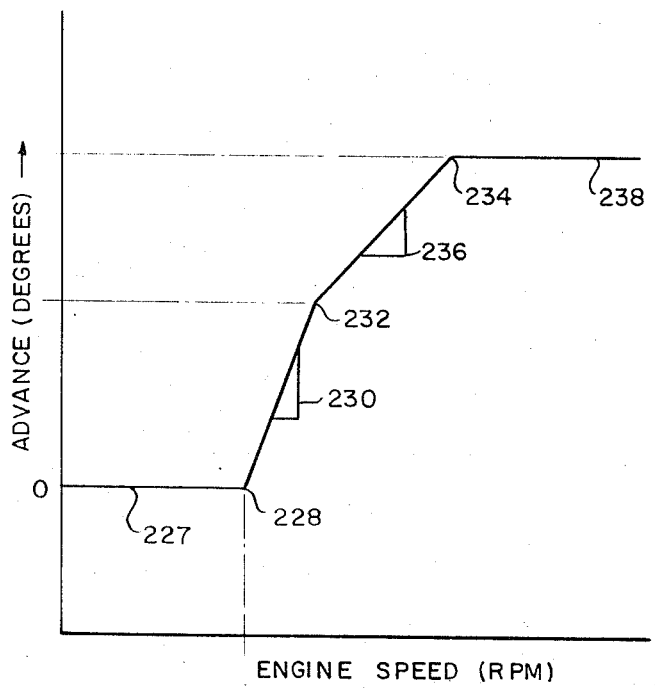
FIG. 7 is a graph showing a typical relationship between engine speed and the ignition timing angle.

The outputs of each of the pressure transducers 10 and 12, as well as the speed transducer 14, are coupled to respective analog signal function generator sections 16, 18 and 20. The amplitude of the inputs to these generators, i.e., the outputs of the respective transducers 10, 12 and 14, increases in a generally linear fashion from zero volts as the particular pressure differential and/or engine speed increases. The generator sections 16, 18 and 20 are initially calibrated so that as their respective input signals increase from zero volts, their output signals, when plotted relative to an ignition timing angle, will characterize an optimum curve. A typical optimum curve for the output of the generator section 16 associated with the intake manifold vacuum is shown in FIG. 5. In this curve, the manifold vacuum, in inches of mercury, is plotted against the angle between the crank shaft and the distributor cam shaft. A typical optimum curve for the spark port vacuum generator section 18 is shown in FIG. 3, and a typical characteristic engine speed optimum curve is shown in FIG. 7. Each of these curves is a linear approximation of the ideal curve which is adequate for the intended purposes. These curves will hereinafter be referred to in detail.

The outputs of the generator sections 16, 18 and 20 are summed together in a summing amplifier 22 together with the output of a command angle adjustment 24. The summation of the three generator section outputs enables one aggregate signal to be used to control the angular displacement of the distributor, and thereby the ignition timing angle of the engine.

The command angle adjustment 24 is used to introduce any desired timing angle offset into the ignition timing characteristics. This offset is treated as a constant by the system. Furthermore, the manually controlled command angle adjustment can also be used to alter the distributor position in the instance when it may be desired to generate new timing curves. For example, the engine may be run at a known speed and under known load conditions. The command angle adjustment may then be used to manually change the ignition timing angle for taking data on various engine operating parameters for evaluation purposes.

The summing amplifier 22, in addition to aggregating the outputs of the manifold vacuum, spark port vacuum and engine speed generator sections 16, 18 and 20 together with the command angle adjustment control 24, limits the total negative and positive command angle signals to a predetermined maximum amplitude. Imposing a limit on the maximum amplitude of these signals ensures that the ignition timing angle will not be advanced or retarded to the point of causing detrimental wear on the engine.

The output of the summer 22 is coupled to a servo amplifier 26 to accordingly drive a servo motor 28 which is coupled, as by gears 29, to the top end of the distributor shaft in the distributor 30. The motor is also coupled by gears 31 to a feedback source potentiometer 32 or other feedback signal source to rotate the potentiometer through the same angle through which the distributor shaft is rotated. The polarity of the potentiometer output is inverted by an inverter 34 and thereafter applied to the input of the servo amplifier 26 for altering the output of the amplifier 26 in accordance with the amount the distributor shaft actually rotated compared with the angle through which it was commanded to rotate.

Figure 2:
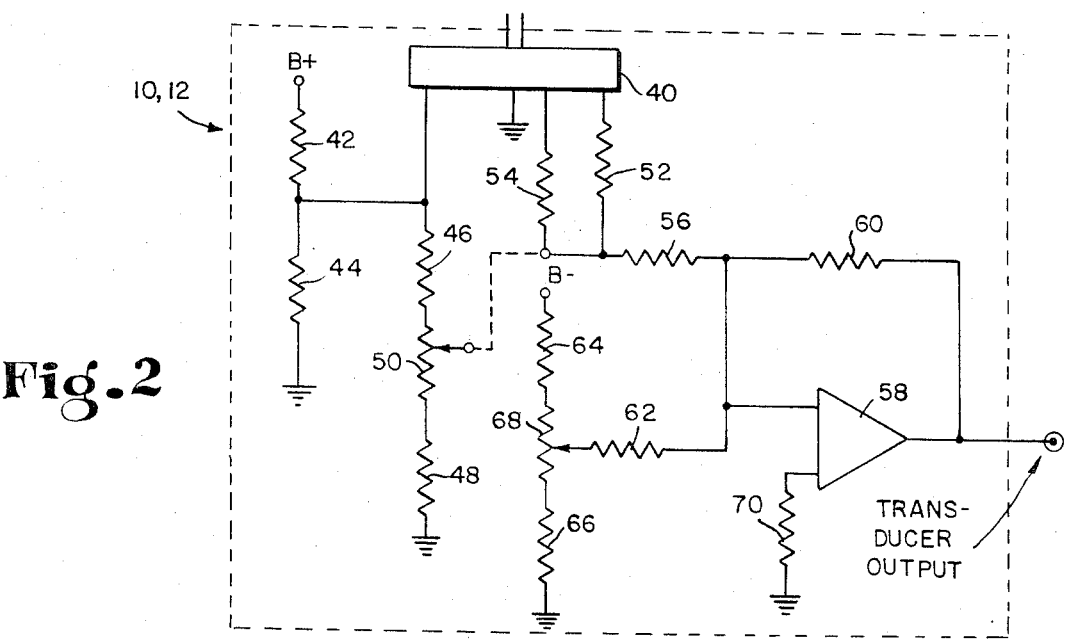
FIG. 2 is a circuit diagram of one of the vacuum transducers used in the invention.

The two vacuum transducers 10 and 12 are identical in circuit configuration so that only one will be described in detail as representative of both. The circuit of the pressure transducers, as shown in FIG. 2, comprises a pressure sensor such as a strain gage, biasing and balancing networks and an appropriately scaled preamplifier. The strain gage pressure sensor 40 is mounted to appropriately sense the level of vacuum created in the engine intake manifold. Two serially connected resistors 42 and 44 are connected between a B+ voltage supply and ground, and have their common connection connected to the sensor 40 for supplying voltage to the sensor. The common connection between these two resistors 42 and 44 is also connected to ground through a serially connected combination of two resistors 46 and 48 and a potentiometer 50. The adjustment of the potentiometer 50 is effected to calibrate the sensor 40 over the range of input pressures.

Two resistors 52 and 54 are connected to the output of the sensor 40 to compensate for increases in temperature by linearizing the response of the pressure sensor over a wide temperature range. The output sides of these resistors 52 and 54 are connected together and to a load resistor 56. The other side of the load resistor 56 is connected to the input of an operational amplifier (op-amp) 58, to a feedback resistor 60 and to a compensation resistor 62. The voltage which appears across the load resistor 56 is linearly proportional to the differential pressures sensed by the pressure sensor 40.

The voltage across the load resistor 56 which is connected to the input of the operational amplifier 58 is offset by voltage supplied from a serial resistance network comprised of two resistors 64 and 66 and a potentiometer 68. This network is connected from a B— voltage supply to ground with the wiper of the potentiometer 68 being coupled through the aforementioned resistor 62 to the inverting input of the op-amp 58. The non-inverting op-amp input is coupled to ground through a balancing resistor 70.

The voltage supplied by the resistive network to the op-amp 58 is used to offset the output voltage of the pressure sensor 40 so that the op-amp 58 will have a zero voltage output when no pressure differential is sensed. The offset is needed because the sensor has an output of approximately five volts D.C. when no pressure differential is present. The negative voltage supplied by the resistive network offsets this null condition voltage.

The gain of the operational amplifier 58, due to its operating characteristics, is approximately equal to the value of its feedback resistor 60 divided by the sensor load resistor 56. The value of the feedback resistor 60 is selected to result in an output scaling factor of preferably 500 millivolts/inch of mercury pressure differential.

Figure 4:
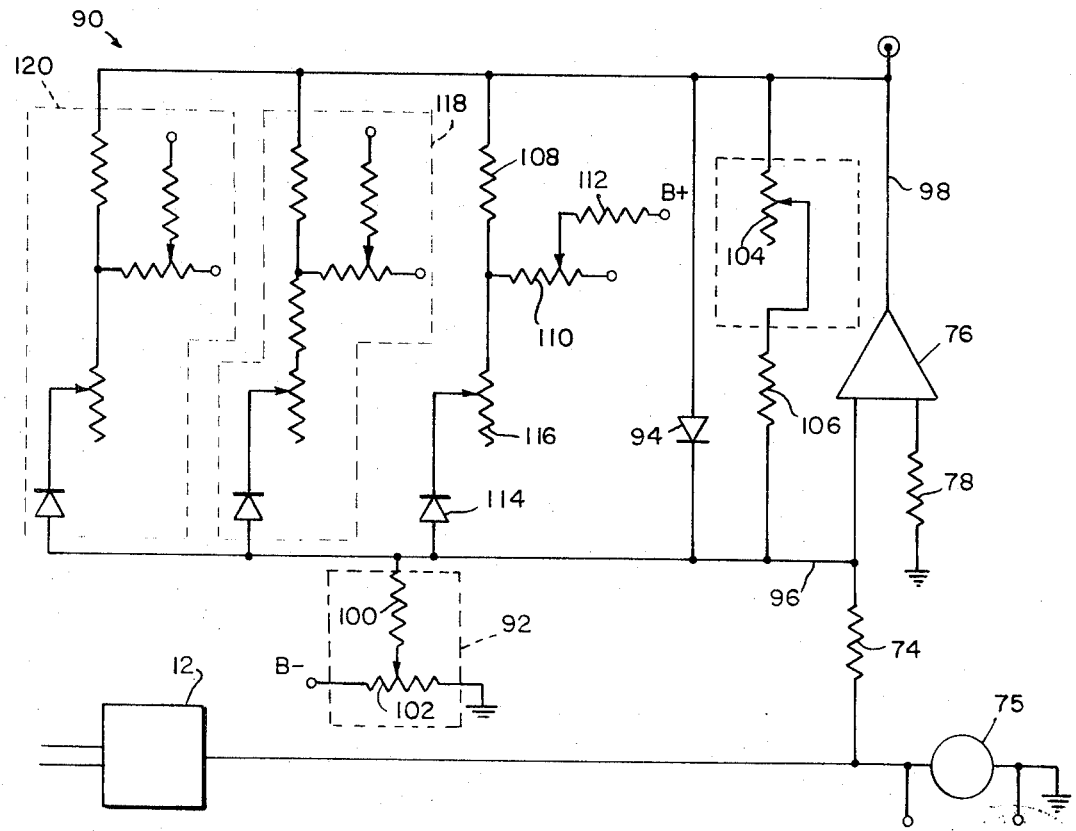
FIG. 4 is a circuit diagram of the spark port vacuum function generator section.

The output of the pressure transducer circuit 12 which monitors the vacuum in the spark port at the base of the engine carburetor is connected to the spark port vacuum function generator 18 shown in FIG. 4. The vacuum sensed by transducer 12 is indicative of the load which the operator senses the engine to have. The input to the generator section 18 is applied through an input resistor 74 to the inverting input of an operational amplifier 76. A meter 75 may be connected between the resistor input and ground for monitoring the amplitude of the input from the transducer 12. The other and non-inverting input to this amplifier 76 is coupled through a balancing resistor 78 to ground. The remainder of the circuitry shown in FIG. 4 is utilized as the feedback network for the operational amplifier 76.

The graph of FIG. 3 is a linear approximation of a typical curve showing the relationship between the magnitude of the spark port vacuum and the angular amount the ignition timing should be altered for optimum engine performance with low exhaust emissions. The graph is comprised of a series of differently sloped lines 80, 81, 82, 83 and 84 and a number of so called break points 86, 87, 88 and 89. The spark port vacuum given in inches of mercury is plotted along the absicissa of the graph which is scaled to represent two inches of mercury per linear or graphic inch. The ordinate axis is scaled to correspond to a four degree change in the ignition timing per graphic inch.

By reference to the graph, for any value of spark port vacuum there is a corresponding number of degrees which the ignition cam should be advanced in order to optimize operation based on the spark port vacuum. The axes are also calibrated in terms of voltage so that one volt from the spark port transducer 12 represents a pressure of two inches of mercury, while a one volt output from the spark port generator section 18 represents an ignition timing change of four degrees. The feedback circuit 90 for the amplifier 76 in FIG. 4 is responsible for the generation of the appropriate timing angle change command voltage for the particular pressure sensed by the spark port transducer 12. As will be seen, the particular relationship between the pressure sensed and the timing angle change commanded is adjustable as desired to accommodate variations in engine operating parameters, or the like.

With reference to this feedback circuit 90, the initial zero slope 80 and the first break point 86 of the graph of FIG. 3 are established by a resistive network 92 and a diode 94. The cathode of the diode is connected to the inverting input conductor 96 of the op-amp 76 and its anode is connected to the output conductor 98 of the same op-amp. The resistive network 92 is comprised of a resistor 100 coupled to the wiper of a potentiometer 102. The potentiometer 102 is connected between the B— voltage supply and ground to supply a controllable negative voltage to the input 96 of the op-amp 76. The op-amp 76 inverts the negative voltage whereby a positive voltage is presented on its output 98. However, the diode 94 is thereby forward biased to electrically short the op-amp output lead 98 to its input lead 96 and reduce the gain of the op-amp 76 to zero. The resulting zero op-amp output establishes the initial zero slope 80 of FIG. 3.

The first break point 86 in the graph occurs when the positive input voltage from the spark port vacuum transducer 12 surpasses the adjusted negative voltage supplied by the resistive network 92. This causes a net positive voltage on the input lead 96 of the op-amp 76 so that its output 98 begins going negative. The negative going output reverse biases the shorting diode 94 so that the gain of the amplifier 76 is then determined by a serially connected potentiometer 104 and resistor 106 in the feedback circuit. The gain in this instance is the resistive value of the potentiometer 104 plus that of the resistor 106 divided by the op-amp input resistance 74. The adjustment of the potentiometer 104 thereby establishes the second slope 81 of the timing angle characteristic curve. The feedback resistor 106 is used as a calibrating resistance to limit the minimum slope of the function curve immediately following the first break point 86.

After the first break point 86, the output of the op-amp 76 continues to negatively rise in a fashion defined by the second slope 81 of the timing characteristic curve. This increasing negative voltage is applied to one side of a resistor 108 whose other side has a positive voltage impressed upon it from a potentiometer 110 whose wiper arm is connected through another resistor 112 to the B+ voltage supply. The resulting positive voltage at the junction between the potentiometer 110 and the resistor 108 reverse biases a diode 114 whose cathode is coupled to that junction through another potentiometer 116. The negative output voltage of the op-amp 76 continues to rise along the second slope 81 until the output voltage exceeds that of the positive voltage on the cathode of the diode 114. When this occurs, the diode 114 is forward biased to provide a feedback path through the first resistor 108 and the second potentiometer 116 to the input conductor 96 of the op-amp 76. The relative setting or adjustment of the first potentiometer 110 supplying the positive voltage is responsible for the second breakpoint 87.

The forward biasing of the second diode 114 provides a resistive feedback network for the op-amp 76 comprised of two serial connections of a resistor 106, 108, and a potentiometer 104, 116 connected in parallel. It may be seen that the second feedback path is effective at the second break point 87 and serves to reduce the second slope 81 by an amount necessary to obtain the third slope 82. Again, the fixed resistor 108 in the second feedback path is used to limit the minimum value of the third slope 82 and the potentiometer 116 is used to alter the slope 82 from that value.

In an analogous manner, the remaining two slope and break point control sections 118 and 120 for the spark port vacuum timing angle characteristic curve are adjusted by establishing the predetermined positive voltage which the negative voltage output of the op-amp 76 must exceed in each case to forward bias a diode and thereby add another parallel resistive branch to the feedback network.

The timing angle characteristic curve relative to the spark port vacuum can be altered by adjusting any of the break point or slope controlling potentiometers. Preferably, these potentiometers are linear within 0.5 percent which is adequate for the accuracy needed.

Figure 6:
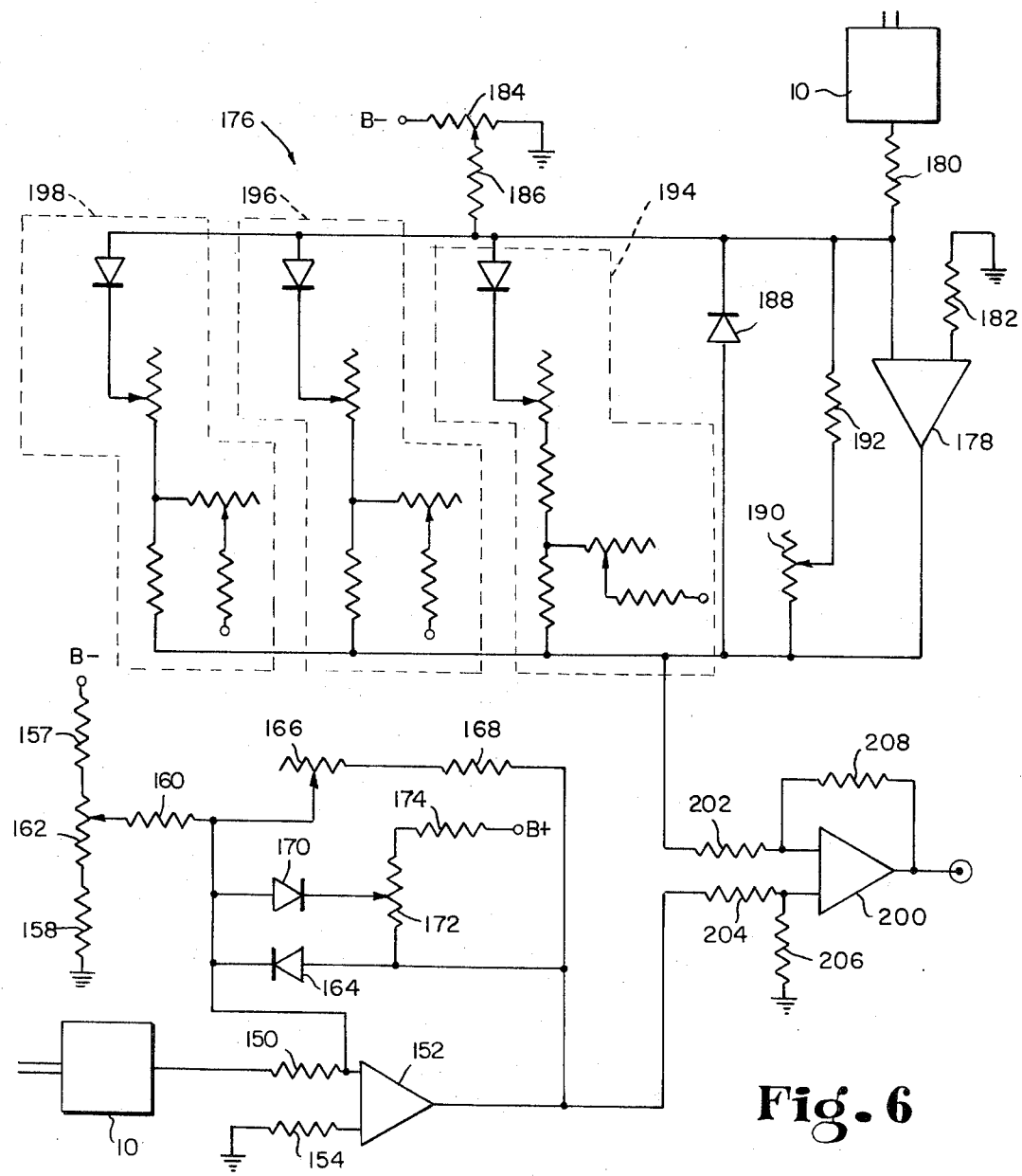
FIG. 6 is a circuit diagram of the intake manifold vacuum function generator section.

The optimum timing angle characteristic graph for the intake manifold vacuum is shown in FIG. 5, and the circuitry for the generator section 16 capable of generating that curve is shown in FIG. 6. The manifold vacuum is indicative of the load condition which is sensed by the engine. At low speeds, and thereby low load levels, some measure of retardation in the timing angle has been found advantageous for exhaust emission control. Furthermore, retardation of the timing angle whereby the fuel charge in the engine cylinders is ignited at a later time subdues the engine noise which may be particularly offensive at idling or low speeds. As the speed and the load on the engine increase, it is necessary for efficient operation to also advance the timing angle characteristic. Too much timing advance, however, may result in engine "knock."

These considerations are typified in the curve of FIG. 5. This curve has an initial segment 124 having a zero slope which is terminated by a first break point 126. At the first break point 126 the timing angle is retarded as exemplified by a negative going slope 128 which continues until a second break point 130 occurs. The timing angle ceases to negatively increase after the second break point 130 and then remains for a zero slope segment 132 at the retardation angle reached. The zero slope segment 132 is terminated by a third break point 134 after which the curve rises at a positive slope 136. Each of the subsequent break points 138, 140 and 142 are the beginning of a decrease in the rate of advancement of the timing angle with respect to increases in manifold vacuum. In other words, the slopes 144, 146 and 148 respectively following the latter three break points 138, 140 and 142 are each less than the preceeding slope and are generated by successively attenuating the initial positive slope 136.

The circuit shown in FIG. 6 is used to generate an output voltage representative of the graph of FIG. 5 in that a pressure differential of two inches of mercury preferably corresponds to an advancement or retardation of four degrees in the ignition timing. The input to the circuit is from the operational amplifier 58 in the pressure transducer package 10 which monitors the pressure differential between the intake manifold and the atmosphere.

The output of the manifold vacuum pressure transducer 10 is applied to a summing input resistor 150 for the inverting input of an operational amplifier 152. The non-inverting input of the amplifier 152 is connected to ground through a balancing resistor 154. The feedback circuit 156 for this amplifier is responsible for establishing the characteristic curve up to the third break point 134.

The amplifier 152 inverts the positive input voltage from the transducer package 10 thereby making its output negative. However, a resistive network comprised of three resistors 157, 158 and 160, the latter of which is connected to the wiper of a potentiometer 162, is connected between the B— voltage and ground whereby an adjustable negative voltage is applied across the wiper arm resistor 160 to the summing junction of the operational amplifier 152. As long as the magnitude of this voltage is equal to or greater than the input voltage from the pressure transducer 10 the output of the amplifier 152 will be positive.

The cathode of a diode 164 is connected to the summing junction of the op-amp 152, and its anode is connected to the output of the amplifier. The diode 164 is forward biased as long as the amplifier output is positive which reduces the gain of the operational amplifier to zero. The resulting zero voltage output corresponds to the first segment 124 of the characteristic curve for the manifold vacuum. The point at which the output curve breaks away from zero is determined by the setting of the potentiometer 162. This is the first break point 126 on the graph.

The retardation slope 128 following the first break point 126 is determined by the setting of a potentiometer 166 in series with a resistor 168 in the feedback circuit. The magnitude of this slope is equal to the sum of the resistance specified by the setting of the potentiometer 166 plus the minimum slope setting resistor 168 divided by the summing input resistance 150.

The negative slope 128 continues until the magnitude of the positive voltage at the summing junction of the op-amp 152, which is also applied to the anode of another diode 170, exceeds the magnitude of the positive voltage impressed on the cathode of diode 170. The positive voltage on the cathode is supplied from the wiper of a potentiometer 172 which is connected between the output of the amplifier 152 and through another resistor 174 to the B+ voltage supply. The setting of the potentiometer 172 establishes the level of input voltage from the pressure transducer 10 at which the diode 170 will be forward biased. The input transducer voltage at which this occurs defines the second break point 130. The resulting slope will be zero since the now conducting diode 170 reduces the gain of the amplifier 152 to zero.

The second zero slope portion 132 of the curve extends until the third break point 134 which initiates the first positive slope segment 136 of the curve. The third break point 134 as well as the first positive going slope 136 and all subsequent break points 138, 140 and 142 and the remaining positive slopes 144, 146 and 148 are generated by the feedback circuit 176 for a second operational amplifier 178. The summing input resistor 180 connected to the inverting input of amplifier 178 has its other terminal connected to the manifold vacuum transducer 10. The non-inverting input of the amplifier 178 is coupled to ground through a balancing resistor 182.

A potentiometer 184 connected between ground and the B− voltage has its wiper connected through a resistor 186 to the summing junction of the amplifier 178. The negative voltage thereby placed on the summing junction is inverted by the amplifier 178 resulting in a positive voltage output which forward biases a diode 188 connected between the amplifier output and its summing junction so that the gain of the amplifier is reduced to zero. The negative voltage potentiometer 184 is adjusted so that the negative voltage which it places on the summing junction of the amplifier is equal in magnitude to the output voltage of the manifold vacuum transducer 10 at the point 134 where the characteristic curve is to break away from the zero slope segment 132.

The negative output on the amplifier 178 when the negative voltage is surpassed reverse biases the diode 188 resulting in the feedback for the amplifier being taken across a potentiometer 190 and a resistor 192. The gain of the amplifier 178 is then equal to the feedback resistance of the resistor 192 and the adjusted value of the potentiometer 190, all divided by the input summing resistance 180. In terms of the curve of FIG. 5, the setting of the potentiometer 190 establishes the slope 136 of the curve after the third break point 134.

The remaining three sections 194, 196 and 198 of the feedback circuit 176 determine the remaining three break points 138, 140 and 142, as well as the remaining three slopes of the curve 144, 146 and 148. The procedure for establishing these break points and slopes using the potentiometers included in these three feedback sections 194, 196 and 198 is analogous with that already explained with respect to the spark port vacuum curve generation in FIG. 4.

The output of the amplifier 152 associated with the retardation angle and the output of the operational amplifier 178 corresponding to the advanced timing angle are compared and summed in a third operational amplifier 200. The output of the advanced angle amplifier 178 is coupled through an input resistance 202 to the inverting input of the amplifier 200, while the output of the retarded angle amplifier 152 is coupled through an input resistance 204 to the non-inverting input of the amplifier 200. This input is also coupled to ground through a balancing resistance 206. Gain control for the amplifier 200 is provided through a feedback resistor 208 for amplifying and scaling purposes.

The output of the operational amplifier 200 represents the negative of the difference between the retarded and advanced characteristic which provides the requisite output signal polarity as well as the fully complemented timing angle command signal based on the manifold vacuum.

Figure 8:
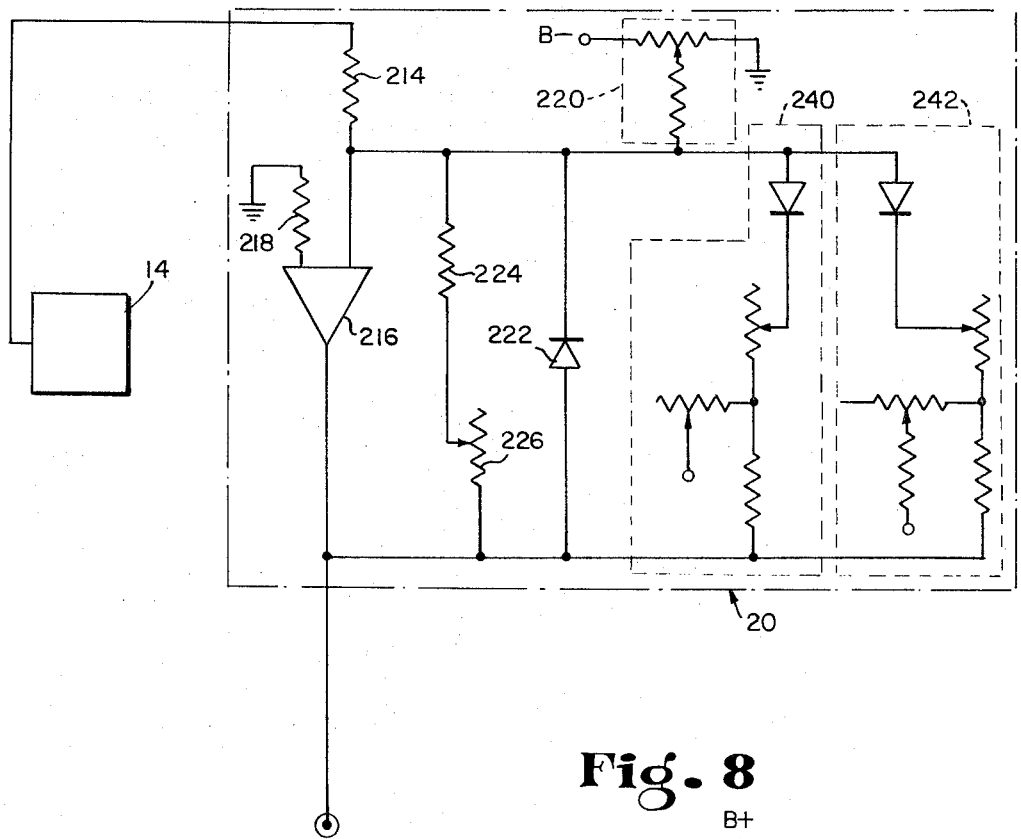
FIG. 8 is a circuit diagram of the engine speed function generator section.

The timing angle characteristic showing the relationship between engine speed and the ignition timing is shown in FIG. 7. The engine speed, scaled so that one graphic inch equals 500 rpm, is plotted on the abscissa axis, and the timing angle, scaled to one graphic inch equals four degrees, is plotted on the ordinate axis. A circuit 20 capable of generating the curve of this graph is shown in FIG. 8.

A conventional pulse to D.C. level converter is connected to monitor the pulses on the distributor coil wire and comprises the speed transducer 14. The amplitude of the D.C. output signal from the transducer 14 is representative of the rate of which these pulses occur. The output is applied to a summing resistor 214 which is connected to the inverting input of an amplifier 216. The non-inverting input of the amplifier 216 is connected through a balancing resistor 218 to ground. In a manner analogous to that described for the manifold vacuum curve generator and the spark port vacuum curve generator sections 16 and 18, the output of the amplifier 216 is held at zero by a resistive network 220 supplying a negative voltage to the amplifier input to forward bias a diode 222 until the positive output of the transducer 14 surpasses that of the supplied negative voltage. The output of the amplifier 216 then goes negative to reverse bias the diode 222. The gain of the amplifier is then specified by a calibrating resistor 224 and a potentiometer 226 divided by the input resistance 214.

The magnitude of the negative voltage impressed on the summing junction of the amplifier 216 specifies the point 228 at which the curve broke away from a zero slope 227, and the setting of the feedback potentiometer 226 specifies the slope of the curve 230 immediately after that point 228. The remaining break points 232 and 234, as well as the remaining slopes 236 and 238, are established by the remaining two sections 240 and 242 in the feedback circuit for the amplifier 216. The establishment of these break points and slopes is identical with the technique already described.

Figure 9:
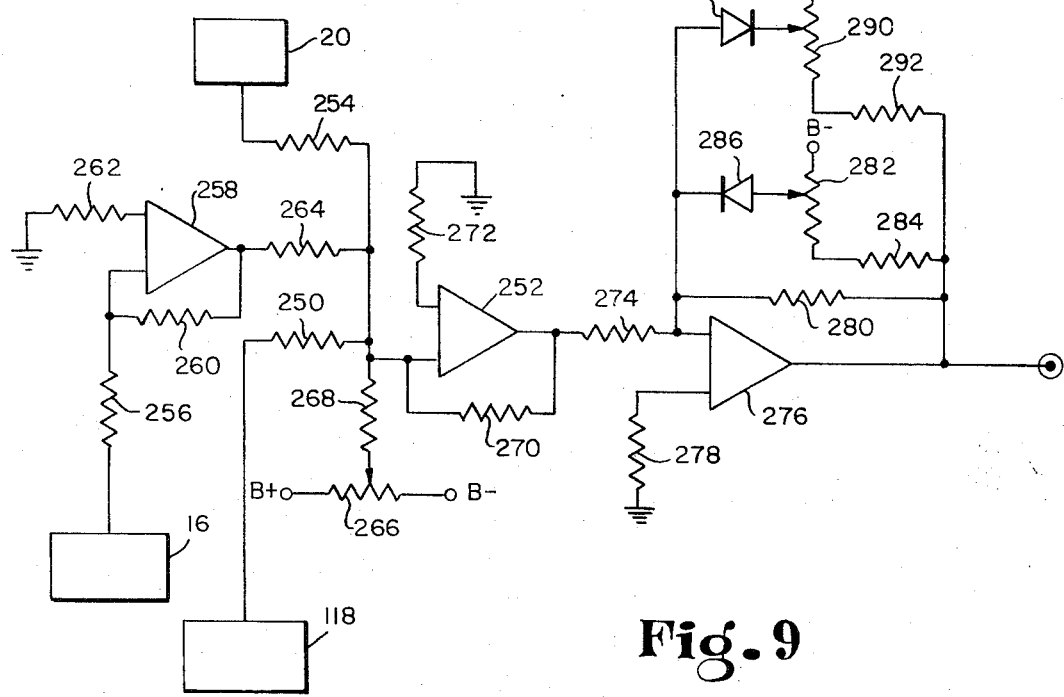
FIG. 9 is a circuit diagram of the summing and limiting portion of the system.

The signal summing circuitry for generating a single commanded ignition timing angle representative of the spark port vacuum, input manifold vacuum and engine speed signal generator section outputs taken in the aggregate is shown in FIG. 9. The output of the spark port vacuum curve generator section amplifier 76 (FIG. 4) is applied to a summing input resistor 250 which is connected to the summing junction 251 of the inverting input of an operational amplifier 252. The output amplifier 216 (FIG. 8) in the generator section for the engine speed timing angle curve is coupled to another summing input resistor 254 connected to the same summing junction 251 of the op-amp 252. Feedback for the summing amplifier 252 is obtained through a resistor 270. The non-inverting input of the op-amp 252 is connected through a balancing resistor 272 to ground.

The output of the manifold vacuum curve generating amplifier 200 (FIG. 6) is applied to an input summing resistor 256 connected to the inverting input of a second operational amplifier 258. The feedback resistor 260 for this amplifier 258 is equal to that of the input resistance 256 so that the input signal is inverted in polarity with unity gain. The non-inverting input of this amplifier 258 is connected to ground through a balancing resistor 262.

The output of the second operational amplifier 258 is applied to an input summing resistor 264 which is also connected to the same summing junction 251 as the other two input signals. The wiper arm of a potentiometer 266 which is connected between the B− voltage and the B+ voltage is also connected through a summing input resistor 168 to the common summing junction 251 of the op-amp. The voltage supplied by the potentiometer 266 is treated as a constant offset for the commanded angle. The potentiometer comprises the command angle adjustment 24. The offset may be used to compensate for variations in distributors or in their mountings.

The output of the summing amplifier 252 represents the summation of the three curve generating circuits at any given moment which may be offset by the constant signal injected by the command angle adjusting potentiometer 266. This output is applied to a summing input resistor 274 connected to the inverting input of a third op-ram 276. The non-inverting input of this op-amp 276 is connected through a balancing resistor 278 to ground. Feedback for this op-amp 276 is normally provided through a resistor 280 whose resistance is equal to that of the input resistor 274 to provide unity gain for the amplifier.

The maximum negative angular displacement of the distributor, and thereby the ignition cam, is limited by the setting of a potentiometer 282 in the feedback circuit which is connected between the B− voltage supply and through a fixed resistor 284 to the output of the op-amp 276. Its wiper is connected to the anode of a limiting diode 286. The potentiometer 282 places an adjustable magnitude of negative voltage on the anode of the diode 286. The cathode of the diode 286 is connected to the summing junction of the op-amp 276. The diode remains reverse biased, and thereby non-conducting, unless the voltage on the summing junction of the op-amp 276 becomes more negative than that placed on the anode of the diode by the potentiometer 282. If this occurs, the resistor 284 in that feedback branch will then be taken in parallel with the other feedback resistor 280 to substantially reduce the gain of the amplifier 276.

In a similar manner, the positive angular displacement of the distributor is limited by a diode 288 which has its anode connected to the summing junction of the amplifier 276 and its cathode connected to the wiper arm of a potentiometer 290. The potentiometer 290 is connected between the B+ voltage supply and through a fixed feedback resistor 292 to the output of the op-amp 276. The diode 288 is reverse biased unless the positive voltage at the summing junction of the amplifier 276 becomes more positive than the voltage placed on the cathode of the diode 288 by the potentiometer 290. If this should occur, the fixed feedback resistor 292 is then placed in parallel with the first feedback resistor 280 to again substantially reduce the gain of the amplifier 276 to limit its output.

The limiting of the magnitude of the negative angle through which the distributor may rotate is done primarily to prevent large retardation angles not compatible with engine emission control. On the other hand, large advance angles are limited to prevent engine knock and excessive engine wear.

Figure 10:
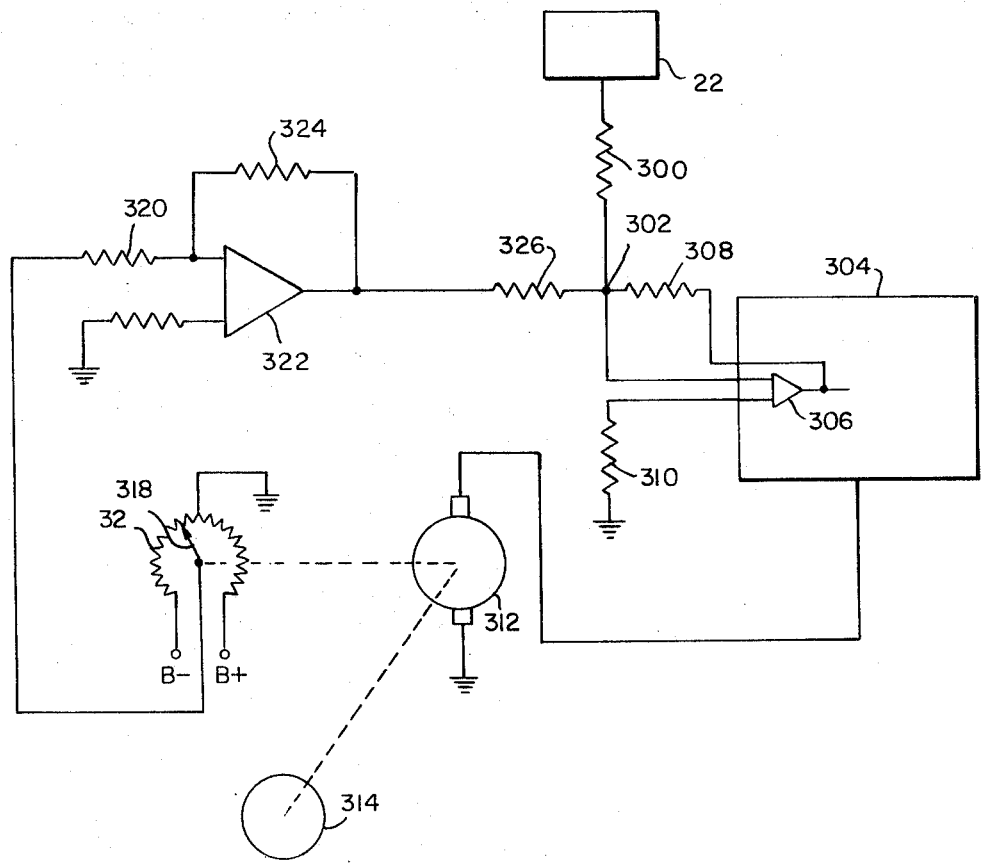
FIG. 10 is a diagram showing the closed loop positioning control for the ignition distributor.

The output of the command angle limiting amplifier 276 is applied as the command input to the closed loop control system shown in FIG. 10. The command angle signal is applied to an input summing resistor 300 which is connected to the summing junction 302 of the conventional servo amplifier 26. Feedback for the first stage operational amplifier 306 of the servo amplifier 26 is provided through a resistor 308. The non-inverting input of the first stage amplifier 306 is connected to ground through a balancing resistor 310.

Figure 11:
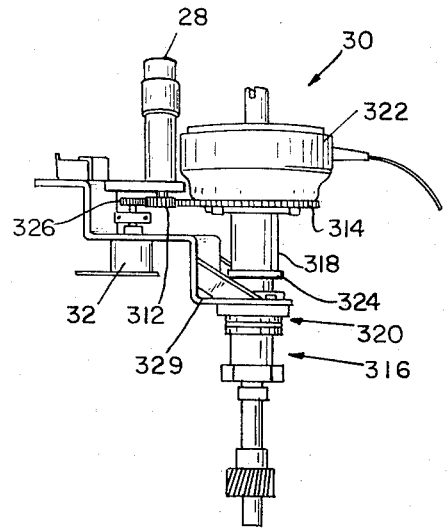
FIG. 11 shows a modified ignition distributor and associated gearing for use in the invention.

The output of the servo amplifier 26 is coupled to and controls the rotation of the servo motor 28, also shown in FIG. 11 with the distributor 30 and the feedback potentiometer 32. The servo motor 28, as by gears 312, 314, rotates the modified ignition distributor 30 through an appropriate arcuate displacement. The conventional distributor used for this purpose has been modified by separating its body into two sections 316 and 318. The lower section 316, including the mounting flange 320, is cut from the upper portion of the distributor 318 which includes the distributor head 322. The mating surfaces of the two parts can be then ground and polished and Teflon bearings 324 introduced between them. In this manner, the distributor head 322 and thereby the ignition cam (not shown), have the ability to rotate with respect to the lower and fixedly mounted body portion 316.

The gearing between the servo motor 28 and the distributor 30 can be appropriately chosen to accommodate particular engine and distributor designs as well as to provide the proper amount of ignition angle advance or retardation in accordance with the generated command angle signal.

The feedback potentiometer 32 is coupled directly to the output gear 312 of the servo motor 28, as by a gear 316, to insure that its wiper arm 328 is rotated through the same angle as that through which the distributor 30 is rotated. The mounting bracket 329 for the potentiometer 32 and the servo motor 28 is also connected to the lower portion 316 of the distributor 30. The leads of the potentiometer 32 are connected between the B+ and B− voltage with a center tap being grounded. The output of the potentiometer 32 taken from the wiper arm 328, provides an electrical signal proportional to the mechanical rotation of the distributor 30.

The potentiometer output is applied to an input summing resistor 300 connected to the summing junction of the inverting input of an operational amplifier 332 used as the basis for the inverter 34. The non-inverting input is connected to ground through a balancing resistor 331. Unity gain is provided for this amplifier 332 by a feedback resistor 334 to invert only the polarity of the feedback potentiometer output signal for application through a summing resistance 336 to the same summing junction 302 as the input from the command angle summing resistor 300. The net effect of this common application to the amplifier summing junction 302 is to apply the difference of these two signals to the servo amplifier 304 for appropriate control of the servo motor and thereby the distributor 314.

The feedback signal provides accurate control of the distributor rotation, and thereby the ignition timing angle, in that the error signal which actually reaches the servo amplifier 304 is proportional not only to the desired advanced or retarded ignition angle, but is proportional to the angle actually obtained.

The present invention may be used, for example, as a testing device whereby various engine operating conditions are monitored as one or more of the generator sections 16, 18 and 20 have their feedback circuits changed. The data obtained can then be evaluated for possible generation of more efficient timing angle curves for the particular engine.

Furthermore, the adjustability of the timing angle with respect to various operating conditions obviates the need for a plurality of different types of ignition distributors, since by use of the present invention one distributor system can be readily adjusted to accommodate any engine requirement.

I claim:

1. An electronically controlled system for adjusting the ignition timing angle for an internal combustion engine, comprising transducer means for continuously sensing an operating condition of the engine and for generating a first electrical signal having a magnitude representative of said operating condition, the magnitude of said first signal being linearly changed by said transducer means in accordance with changes in said operating condition; a non-linear signal generator coupled to said transducer means for generating a second electrical signal, said non-linear signal generator including an operational amplifier and non-linear feedback means for causing the magnitude of said second signal to change non-linearly and predeterminably in accordance with linear changes in said first signal, said non-linear feedback means having a plurality of interconnected and parallel circuits, each of said parallel circuits having an adjustable resistor and a diode connected in series, and an adjustable voltage source for placing a voltage on one electrode of said diode for causing said diode to be non-conductive unless the input signal to said amplifier from said transducer means exceeds said voltage; and adjustment means responsive to said second signal for adjusting the ignition timing angle of the engine.

2. An electronically controlled system for adjusting the ignition timing angle for an internal combustion engine, comprising transducer means for continuously sensing an operating condition of the engine and for generating a first electrical signal having a magnitude representative of said operating condition, the magnitude of said first signal being linearly changed by said transducer means in accordance with changes in said operating condition; a non-linear signal generator coupled to said transducer means for generating a second electrical signal and including non-linear feedback means for causing the magnitude of said second signal to change non-linearly and predeterminably in accordance with linear changes in said first signal; adjustment means responsive to said second signal for adjusting the ignition timing angle of the engine; adjustment feedback means coupled to said adjustment means for generating an electrical signal in accordance with the amount the ignition timing angle was adjusted by said adjustment means; and comparison means coupled to said non-linear signal generator and to said adjustment feedback means for comparing said adjustment feedback means generated signal with said second electrical signal and for adjusting said second signal in accordance with any inequality between the two signals.

3. The electronically controlled system as claimed in claim 2, wherein said adjustment means includes means for mechanically adjusting the ignition timing angle of the engine.

4. An electronically controlled system for adjusting the ignition timing angle for an internal combustion engine, comprising a plurality of transducer means for continuously sensing operating conditions of the engine and for generating a plurality of first electrical signals, each having a magnitude representative of the corresponding operating condition, the magnitude of said first signals being linearly changed by said plurality of transducer means in accordance with changes in said corresponding operating conditions; a plurality of non-linear signal generators respectively coupled to said plurality of transducer means for generating a plurality of second electrical signals, and including a like plurality of non-linear feedback means for causing the respective magnitudes of said plurality of second signals to change non-linearly and predeterminably in accordance with linear changes in respective ones of said plurality of first signals; summing means coupled to each of said non-linear signal generators for combining the magnitudes of said plurality of second signals into an aggregate command signal; and adjustment means responsive to said command signal for establishing the ignition timing angle of the engine.

5. The electronically controlled system as claimed in claim 4 wherein said adjustment means includes a servo motor control means coupled to a movable distributor and to said summing means with the addition of adjustment feedback means coupled to said servo motor control means for generating an electrical signal in accordance with the amount the ignition timing angle was adjusted by said servo motor control means; and comparison means coupled to said summing means and said adjustment feedback means for comparing said signal generated by said adjustment feedback means with said aggregate command signal and for adjusting the input signal to said servo motor control means in accordance with any inequality between the two signals.

6. The electronically controlled system as claimed in claim 1 with the addition of limiting means coupled between said summing means and said servo motor control means, whereby the negative and positive magnitudes of said aggregate command signal are limited for defining an operable range over which the ignition timing angle can be adjusted.

7. The electronically controlled system as claimed in claim 6 wherein said limiting means comprises an operational amplifier coupled to said summing means, and a limiting feedback circuit coupled to said amplifier and having a resistance and first and second diodes all connected in parallel, said first diode being reverse biased unless said command signal exceeds a predetermined negative magnitude, and said second diode being reverse biased unless said command signal exceeds a predetermined positive magnitude.

8. The electronically controlled system as claimed in claim 7 including means for adjustably increasing or decreasing said command signal.

9. The electronically controlled system as claimed in claim 18 with the addition of adjustment feedback means coupled to said adjustment means for generating an electrical signal in accordance with the amount the ignition timing angle was adjusted by said adjustment means; and comparison means coupled to said summing means and said adjustment feedback means for comparing said adjustment feedback means generated signal with said aggregate command signal and for adjusting the input signal to said adjustment means in accordance with any inequality between the two signals, and wherein said plurality of transducer means includes first transducer means for sensing the engine load and second transducer means for sensing the engine speed.

10. The electronically controlled system as claimed in claim 4 with the addition of adjustment feedback means coupled to said adjustment means for generating an electrical signal in accordance with the amount the ignition timing angle was adjusted by said adjustment means; and comparison means coupled to said summing means and said adjustment feedback means for comparing said adjustment feedback means generated signal with said aggregate command signal and for adjusting the input signal to said adjustment means in accordance with any inequality between the two signals, wherein said plurality of transducer means includes first transducer means for sensing the engine load and second transducer means for sensing the engine speed, and wherein one of said plurality of non-linear signal generators includes an operational amplifier having an input coupled to the output of one of said transducers, said non-linear feedback means being coupled to said amplifier, said feedback means having a plurality of adjustable branches each of which includes a diode, a serially connected resistance and an adjustable voltage source, one of the electrodes of said diode being coupled to said adjustable voltage source and the other electrode being coupled to the input of said amplifer, said diode being reverse biased unless the output of said one of said transducer means reaches a predetermined and adjustable amplitude.

* * * * *

UNITED STATES PATENT OFFICE
CERTIFICATE OF CORRECTION

Patent No. 3,785,356  Dated January 15, 1974

Inventor(s) Donald E. Niemoeller

It is certified that error appears in the above-identified patent and that said Letters Patent are hereby corrected as shown below:

In the Abstract, line 3, change "for" to --in--.

Column 3, line 52, insert --is-- after "which".

Column 10, line 13, change "of which" to --at which--.

Column 12, line 44, change "300" to --330--.

Column 14, line 56, change "claim 18" to --claim 4--.

Signed and sealed this 4th day of June 1974.

(SEAL)
Attest:

EDWARD M. FLETCHER, JR.
Attesting Officer

C. MARSHALL DANN
Commissioner of Patents

UNITED STATES PATENT OFFICE
CERTIFICATE OF CORRECTION

Patent No. 3,785,356          Dated January 15, 1974

Inventor(s) Donald E. Niemoeller

It is certified that error appears in the above-identified patent and that said Letters Patent are hereby corrected as shown below:

In column 14, line 36, change "1" to --5--.

Signed and sealed this 29th day of October 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,785,356                     Dated January 15, 1974

Inventor(s)  Donald E. Niemoeller

It is certified that error appears in the above-identified patent and that said Letters Patent are hereby corrected as shown below:

Column 11, line 7, change "168" to --268--.
Column 12, line 32, change "316" to --326--.
Column 12, line 54, change "304" to --26--.
Column 12, line 55, change "314" to --30--.
Column 12, line 59, change "304" to --26--.

In the drawings, sheet 4, Fig. 6, the reference numeral --156-- should be applied to generally indicate the feedback circuit of the amplifier 152.

In the drawings, sheet 5, Fig. 9, the reference numeral "118" should be changed to --18--, and the reference numeral --251-- should be applied to the lower input of the amplifier 252.

UNITED STATES PATENT OFFICE
CERTIFICATE OF CORRECTION

Patent No. 3,785,356　　　　　　　　Dated January 15, 1974

Inventor(s) Donald E. Niemoeller

It is certified that error appears in the above-identified patent and that said Letters Patent are hereby corrected as shown below:

In the drawings, sheet 6, Fig. 10, add the reference numeral --331-- to indicate the resistor coupled to the lower input of the amplifier in the upper left hand corner of the drawing, and change reference numeral "304" to --26--
"312" to --28--
"314" to --30--
"313" to --328--
"320" to --330--
"322" to --332--
"324" to --334--
"326" to --336--

Signed and sealed this 27th day of May 1975.

(SEAL)
Attest:

RUTH C. MASON
Attesting Officer

C. MARSHALL DANN
Commissioner of Patents
and Trademarks